A. H. BAKER.
POULTRY FEEDER.
APPLICATION FILED OCT. 21, 1911.

1,020,790.

Patented Mar. 19, 1912.

Witnesses:
George L. Ellsworth
William A. Thibodeau

Inventor:
Andrew H. Baker
by Louis W. Jones
Atty

UNITED STATES PATENT OFFICE.

ANDREW H. BAKER, OF BROCKTON, MASSACHUSETTS.

POULTRY-FEEDER.

1,020,790.  Specification of Letters Patent.  Patented Mar. 19, 1912.

Application filed October 21, 1911. Serial No. 655,838.

*To all whom it may concern:*

Be it known that I, ANDREW H. BAKER, of Brockton, in the county of Plymouth and State of Massachusetts, have invented certain new and useful Improvements in Poultry-Feeders, of which the following is a specification.

This invention relates to improvements in poultry feeders of that class in which there is provided a receptacle having an upper storage chamber or hopper which discharges into a feed chamber therebeneath and from which the poultry feed.

My invention has for its object to provide means whereby the opening to the feed chamber may be closed to prevent the entrance of rats and mice and to provide an improved construction whereby the closure for the opening shall constitute a tray, when lowered, to catch feed as it drops from the bills of the poultry so that it shall not be strewn about the ground.

Another object is to provide a construction by means of which the poultry shall be prevented from throwing the feed from the feed chamber out onto the ground and to prevent the poultry from reaching into the feed chamber at the ends of the tray.

Another object is to provide means whereby the front wall of the feed chamber shall restrain the feed instead of depending upon the tray to perform this function as has heretofore been the practice.

A still further object is to provide a simple, convenient and effective means to regulate the flow of the feed from the storage chamber to the feed chamber.

Still another object is to provide an improved construction whereby the poultry shall be enabled to reach way into the feed chamber so that it shall not be necessary for the storage chamber to discharge the feed onto the tray.

Still other objects and advantages will appear hereinafter.

To the ends above set forth my invention consists in the novel features of construction and in the combination and arrangement of parts set forth in the following specification and particularly pointed out in the appended claims.

Figure 1:
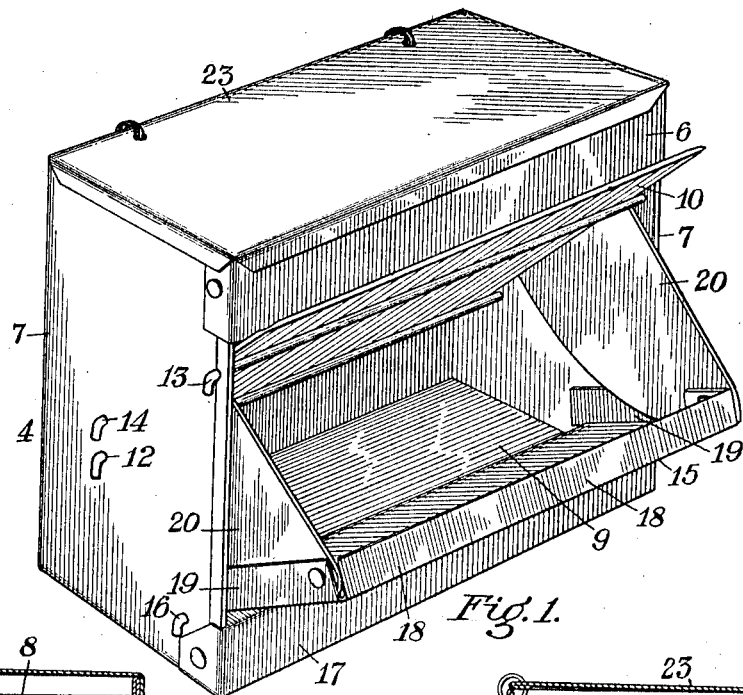
Figure 2:
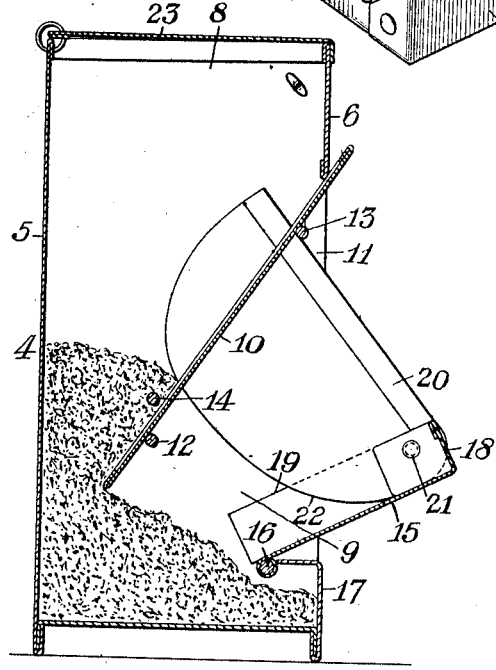
Figure 3:
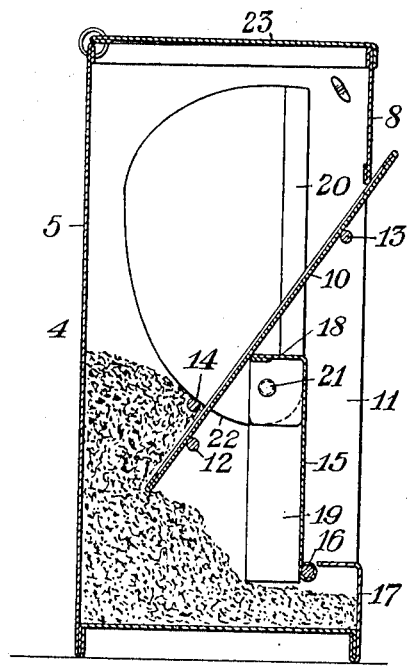

Referring to the drawings:—Figure 1 is a perspective view of a poultry feeder embodying my invention showing the tray lowered. Fig. 2 is a vertical cross-sectioned view of the feeder showing the tray lowered. Fig. 3 is a vertical cross-sectioned view of the feeder showing the tray raised.

In the drawings, the numeral 4 designates generally a feed receptacle having a rear wall 5, a front wall 6, and two side or end walls 7, 7, and divided into a storage chamber 8 and a feed chamber 9 by an inclined partition 10 which also forms a part of the front wall of the chamber 8. The front of the receptacle is provided with an opening 11 leading into the feed chamber 9 and this opening is so large, that is to say, its height is so great that the poultry are enabled to easily reach the feed in the feed chamber without striking their combs.

The inclined partition 10 serves not only as a wall dividing the receptacle 5 into upper and lower chambers but also serves as a very simple, convenient and effective means for regulating the flow of the feed from the storage chamber to the feed chamber. To enable the partition to perform this function it is mounted to slide up and down in its own plane toward and away from the rear wall 5 so as to vary the size of the opening between the upper and lower chambers and is supported by rods 12 and 13 terminating at their ends in the end walls 7, 7, while a third rod 14 serves to prevent the partition from tilting at its lower end.

The upper portion of the partition 10 contacts with the lower edge of the front wall 6 thus forming in effect a continuation of the front wall and providing an entrance of such shape and size as to facilitate the entrance of the heads of the poultry. The partition 10 is held against accidental sliding movement by its frictional contact with the rods 12 and 13 and the lower edge of the wall 6, and projects from the front of the receptacle 4 in such a manner as to be accessible for the purpose of adjusting the partition.

A tray 15 is pivotally mounted on a rod 16 above the bottom of and within the feed chamber 9 and at such a substantial distance from the front of the receptacle 4 that the front edge of the tray, when in its lowered position as shown in Figs. 1 and 2, does not present any obstacle preventing the poultry from reaching the feed in the feed chamber 9. Moreover, by this placing of the pivot, the tray does not serve to restrain the feed but, on the contrary, the feed is prevented from running out onto the ground by a wall or flange 17 below the tray.

The tray 15, it will be observed, is inclined upwardly and outwardly with the result that any feed which drops from the bills of the poultry tends to run back into the feed chamber 9 by reason of such inclination of the tray. As a means for preventing the poultry from throwing the feed horizontally from the feed chamber 9 onto the ground as is their common habit, said tray is provided at its front edge with an upwardly projecting flange 18 and is provided at its ends with similar flanges 19, 19.

As a means for preventing the poultry from reaching in at the ends of the tray, it is provided with a pair of walls 20, 20 pivoted to the flanges 19, 19 on pivots 21, 21, and serving as guards which extend within the receptacle 4 adjacent to its end walls 7, 7. These pivoted walls 20, 20 engage the upper surface of the tray 15 at the rear of their pivots 21, 21 and by such engagement are prevented from swinging any farther toward the rear as will be evident from an inspection of Fig. 2.

When the tray 15 is lowered the front edges of the pivoted walls 20, 20 engage the rod 13 which constitutes a stop serving to limit the downward swinging movement of the tray. When the tray is raised from the position shown in Figs. 1 and 2 to the position shown in Fig. 3 it constitutes a closure for the opening 11 preventing the entrance of rats and mice, and during the raising and lowering of the tray the pivoted walls 20, 20 engage the rod 14 and owing to the cam-shaped rear edges 22, 22, said walls are guided and rocked on their pivots from the position shown in Fig. 2 to the position shown in Fig. 3 and vice versa. The engagement of the edges 22, 22 with the rod 14 will be noted in Fig. 3.

Owing to the construction of the tray 15 and its disposition with respect to the bottoms of the feed chamber 9, the front of the receptacle and the partition 10, said tray serves as an effective closure for the opening 11 and yet, when lowered, it does not prevent the poultry from easily reaching the feed in the bottom of the feed chamber. It will be observed in this connection that the tray is of such small size that, although the front of the opening 11 is of very large size, yet the tray recedes to a position at a substantial distance from the front of the receptacle 4, and at a point where the size of the opening is more restricted.

The top of the storage chamber or hopper 8 is provided with a suitable flanged cover 23 hinged at its rear edge and serving to protect the contents of the feeder. Through the opening which this cover closes the usual dry mash feed is introduced into the storage chamber 8 from whence it passes gradually into the feed chamber 9 where it is consumed by the poultry.

Having thus described my invention, what I claim and desire by Letters Patent to secure is:—

1. A poultry feeder, having, in combination, a feed receptacle having an upper storage chamber and a lower feed chamber into which said storage chamber discharges, said feed chamber being provided with a lateral opening, and a combined tray and closure for said opening pivoted on an axis above the bottom of and within said feed chamber, said tray and closure, when in closed position, being disposed within the outer face of said receptacle and when lowered into open position projecting laterally through said opening.

2. A poultry feeder having, in combination, a feed receptacle having an inclined partition dividing the same into an upper storage chamber and a lower feed chamber into which said storage chamber discharges, said feed chamber being provided with a lateral opening, and a combined tray and closure for said opening pivoted on an axis above the bottom of and within said feed chamber, said tray and closure, when in closed position, being disposed within the outer face of said receptacle and against said inclined wall, and when lowered into open position, projecting laterally through said opening.

3. A poultry feeder having, in combination, a feed receptacle having an upper storage chamber and a lower feed chamber into which said storage chamber discharges said feed chamber being provided with a lateral opening, and an upwardly and outwardly inclined tray pivoted at its inner portion projecting laterally from said opening and provided with an upwardly projecting marginal flange.

4. A poultry feeder having, in combination, a feed receptacle having an upper storage chamber and a lower feed chamber into which said storage chamber discharges, said feed chamber being provided with a lateral opening, a tray pivoted at its inner portion and projecting laterally from said opening and a pair of walls pivoted to the ends of said tray and extending into said feed chamber adjacent to the end walls thereof.

5. A poultry feeder having, in combination, a feed receptacle having an upper storage chamber and a lower feed chamber into which said storage chamber discharges, said feed chamber being provided with a lateral opening, a pivoted tray projecting laterally from said opening, a pair of walls pivoted to the ends of said tray and extending into said feed chamber adjacent to the end walls thereof, and means to guide said walls and rock the same on their pivots as said tray is swung from a lowered to a raised position.

In testimony whereof I have affixed my signature, in presence of two witnesses.

ANDREW H. BAKER.

Witnesses:
 Louis A. Jones,
 George L. Ellsworth.

---

Copies of this patent may be obtained for five cents each, by addressing the "Commissioner of Patents, Washington, D. C."